March 1, 1932. H. A. FOOTHORAP 1,847,429
WRITING ADDING MACHINE
Original Filed May 14, 1921    6 Sheets-Sheet 2
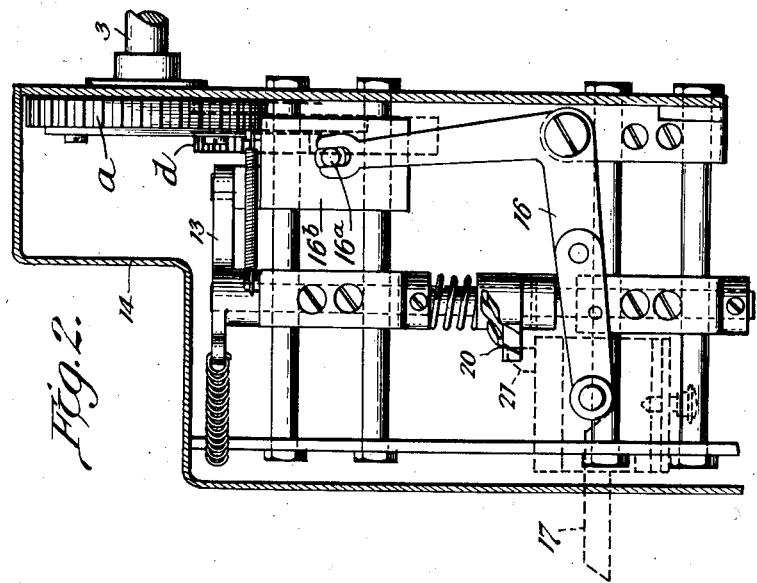
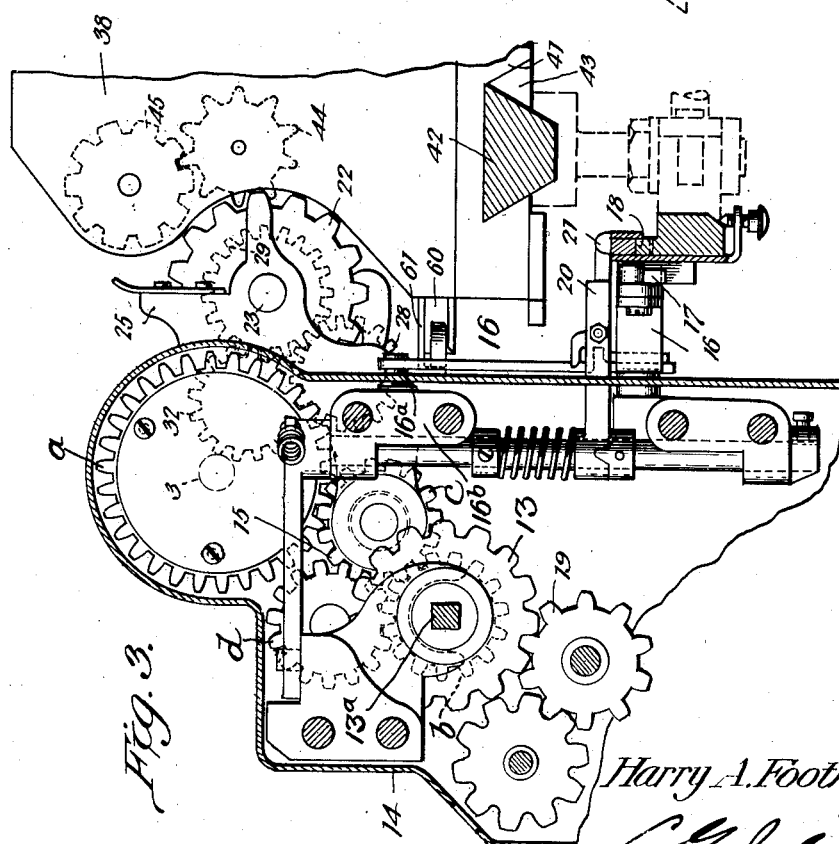
Inventor,
Harry A. Foothorap.
By
Attorney March 1, 1932. H. A. FOOTHORAP 1,847,429
WRITING ADDING MACHINE
Original Filed May 14, 1921  6 Sheets-Sheet 3
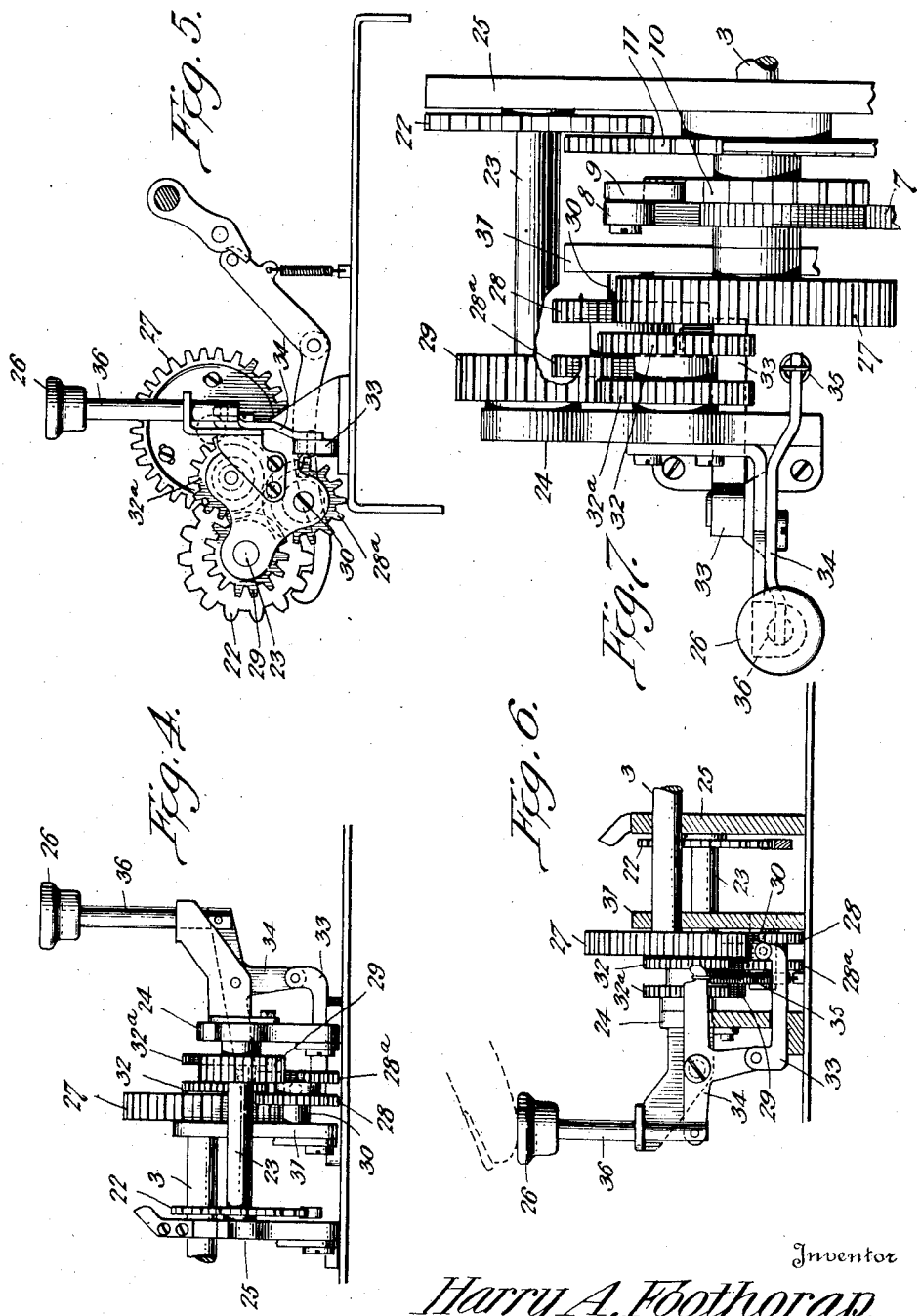
Inventor
Harry A. Foothorap.
By
Attorney Inventor,
Harry A. Foothorap.
By
Attorney March 1, 1932. H. A. FOOTHORAP 1,847,429
WRITING ADDING MACHINE
Original Filed May 14, 1921 6 Sheets-Sheet 5
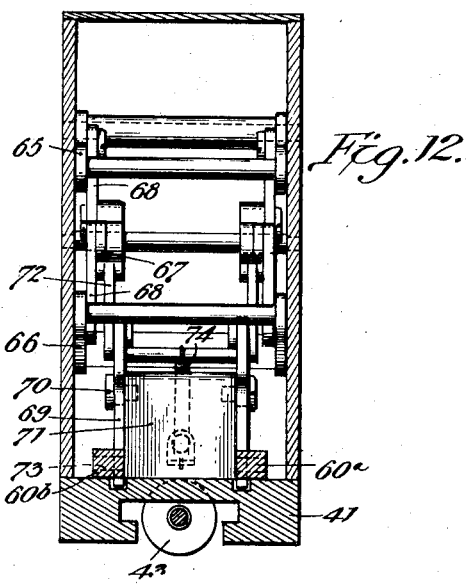
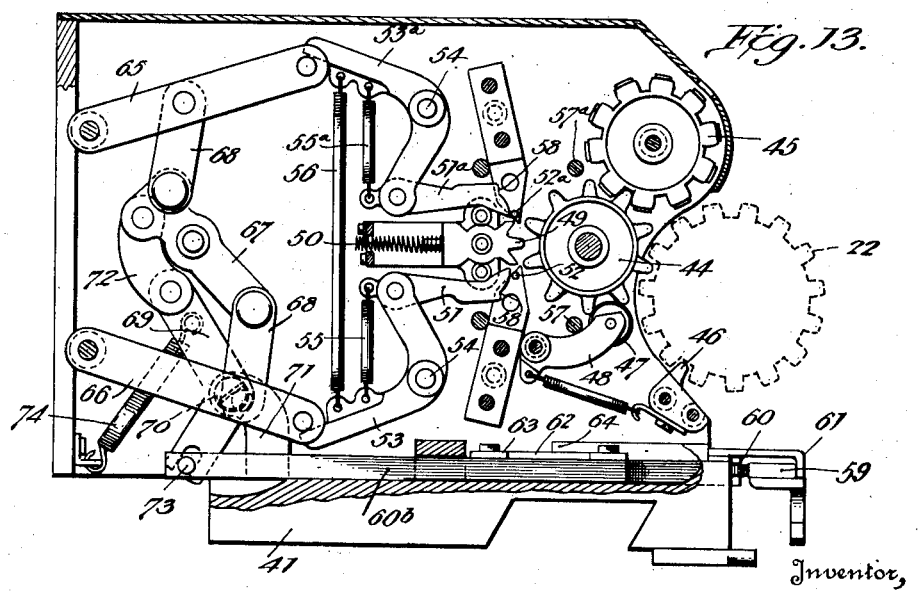
Inventor,
Harry A. Foothorap.
By
Attorney

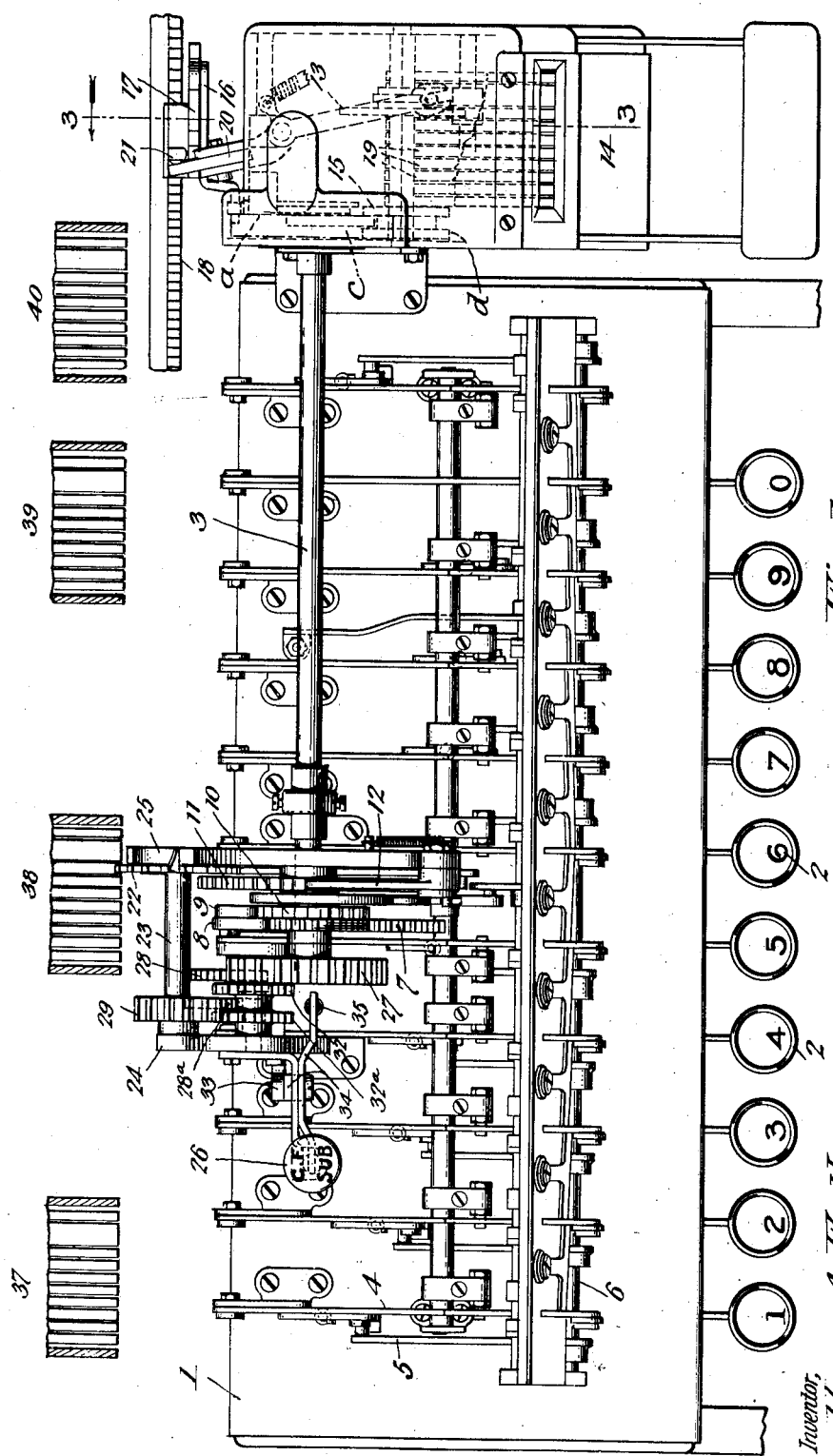

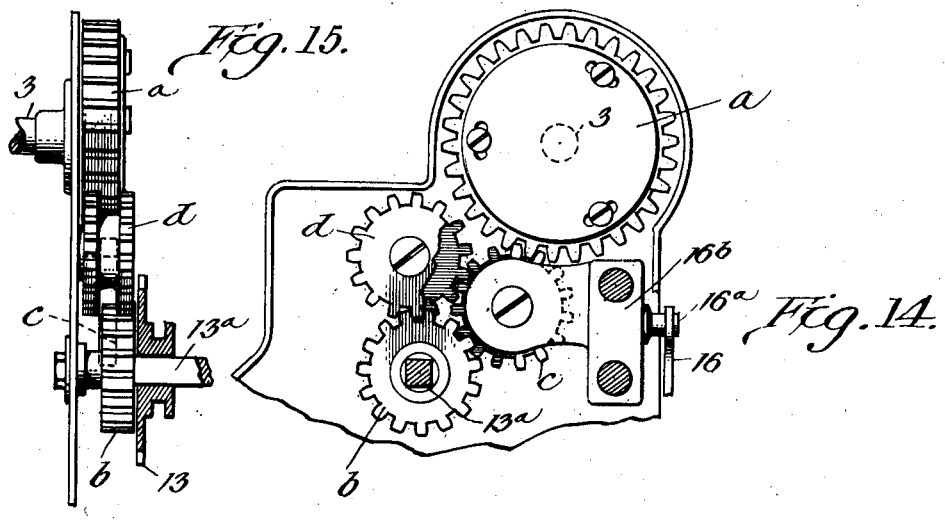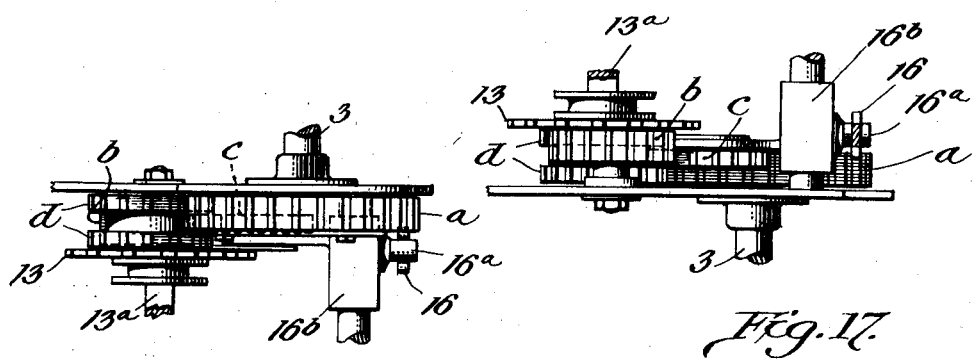

Patented Mar. 1, 1932

1,847,429

UNITED STATES PATENT OFFICE

HARRY ARTHUR FOOTHORAP, OF HARRISBURG, PENNSYLVANIA, ASSIGNOR TO ELLIOTT-FISHER COMPANY, A CORPORATION OF DELAWARE

WRITING ADDING MACHINE

Application filed May 14, 1921, Serial No. 469,530. Renewed January 15, 1932.

This invention relates to writing adding machines of that type, more particularly, which embodies in connection with writing mechanism, a computing mechanism which is operated as an incident of the writing operation, and which may therefore be said, in a sense, to automatically effect computations embracing the printed values.

The object of the invention is to secure a wider range of operative possibility of the computing mechanism and a comparatively universal flexibility of the machine to adapt it to the widest possible range of computations incident to commercial accounting.

A subordinate object is to provide, in a machine of this character, a plurality of master wheels or actuators which may be operated in correspondence in either direction or simultaneously in different directions to operate different computing mechanisms in correspondence in the same or in different directions.

A still further object of the invention is to provide a plurality of master wheels operable simultaneously in the adding direction or in the subtracting direction, or one in the adding direction and the other in the subtracting direction, one of said master wheels serving to operate one at a time a series of column registers, each in either the subtracting or adding direction, and the other master wheel operating a grand register for either addition or subtraction simultaneously with the operation of each of the column registers regardless of whether such column registers are operated for addition or subtraction.

To the accomplishment of the recited objects and others subordinate thereto as will appear as the succeeding description has developed, one embodiment of the invention resides in the construction and arrangement of parts hereinafter described, illustrated in the accompanying drawings and defined in the appended claims.

In said drawings,

Figure 1 is a plan view of a portion of an Elliott-Fisher writing adding machine equipped in accordance with my invention.

Figure 2 is a rear elevation thereof.

Figure 3 is a vertical section on the line 3—3 of Figure 1.

Figure 4 is a rear elevation of the primary master wheel and its reversing mechanism including the subtraction key.

Figure 5 is a side elevation of the subject matter of Figure 4.

Figure 6 is a front elevation of the same structure with the parts in the positions they assume upon the depression of the subtraction key.

Figure 7 is a detailed view, on a somewhat enlarged scale, of the reversing gears.

Figure 8:
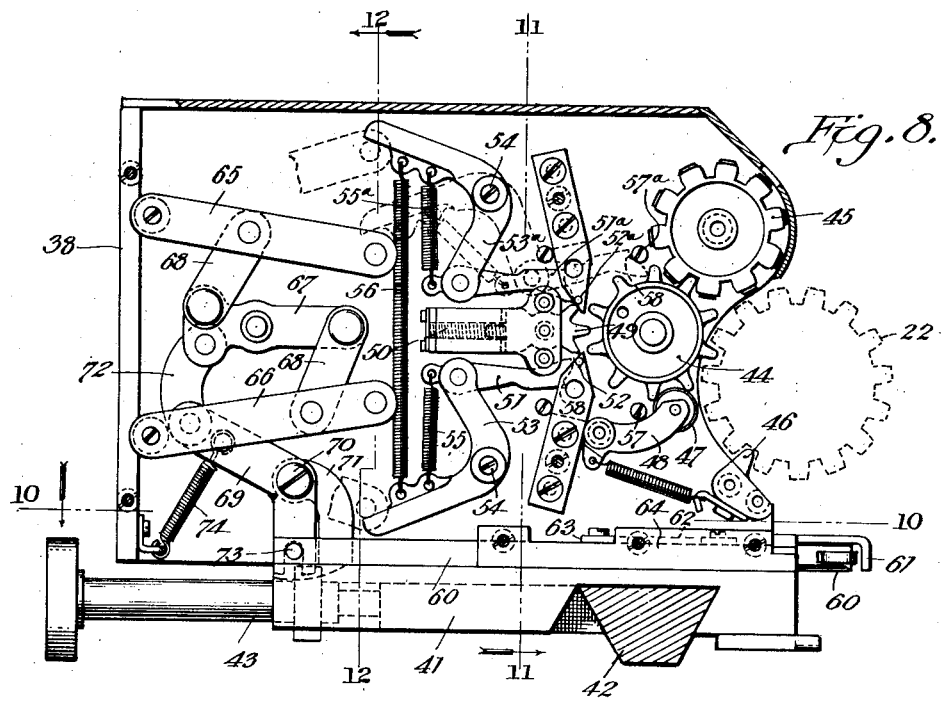
Figure 8 is a side elevation of a reversible column register with one side of the casing removed and showing the parts in normal position, the operated or tripped position of one of the carrying devices being indicated in dotted lines.
Figure 9:
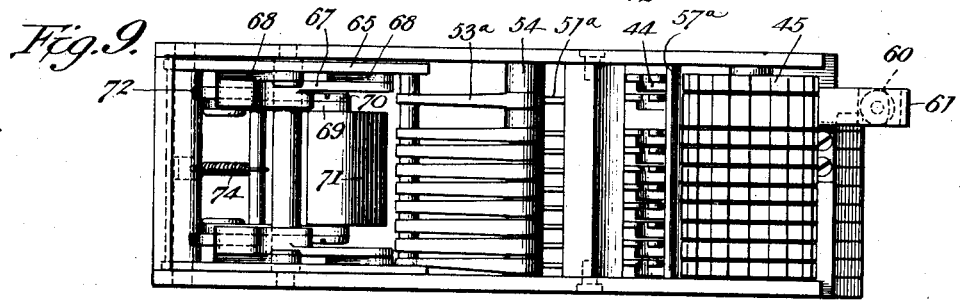
Figure 9 is a plan view of the subject matter of Figure 8.
Figure 10:
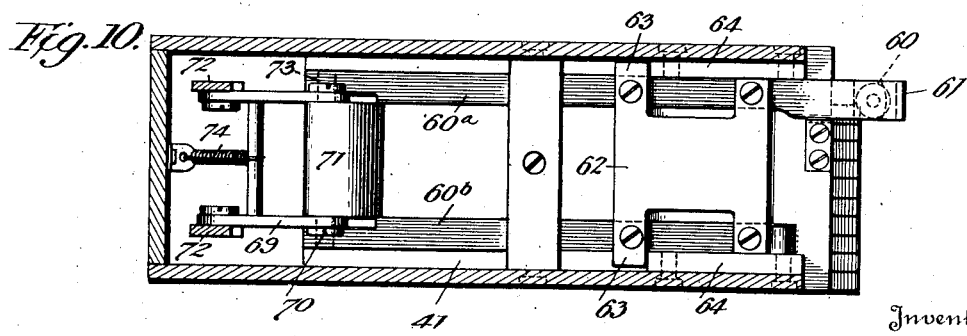
Figure 10 is a horizontal section on the line 10—10 of Figure 8.

Figures 11 and 12 are vertical sections on the lines 11—11 and 12—12 of Figure 8.

Figure 13 is a side elevation, partly in section, of a column register with the parts in the positions they occupy when the reset slide has been moved back by the reset cam.

Figs. 14, 15, 16 and 17 are respectively a side elevation, a front elevation, a top plan and a bottom plan view of the variable gearing between the primary and secondary actuator shafts.

Referring to the drawings, 1 indicates the carriage of an Elliott-Fisher machine of commerce. This machine, as is well understood, is a writing adding machine of the flat platen type, the platen, not shown, serving to support the work sheet in a flat spread-out condition and holding the same stationary with relation to the carriage 1 which traverses the platen longitudinally for line spacing and transversely for letter spacing. The printing mechanism which is of the type arm class is mounted on the carriage for movement therewith and includes letter and numeral keys, the latter of which, indicated by 2, are shown in the drawings. These keys are operated to print the numerals, to control the feed of the carriage for letter spacing and to operate the various other ancillary mechanisms of this class of machines. They also cause the rotation in varying degree of a main or primary actuator shaft 3. The mechanism whereby this varying or differential movement is imparted to the shaft 3 forms no part of the present invention except as it enters into combination to accomplish the object sought to be attained. Therefore, this differential mechanism whereby the shaft 3 is driven from the keys, may be of any well-known type. The particular mechanism shown includes a series of actuator levers 4 operated by the keys 2 and serving in operation to operate a series of driving arms 5 of graduated lengths extended from a driving shaft 6 which in turn operates a driving segment 7 geared to a pawl carrier 8 which has a driving pawl 9 disposed to engage a driving ratchet 10 fixed to the shaft 3. Also mounted on the shaft 3 is a stop ratchet 11 engaged by a stop dog 12 operated by the keys in a manner well understood in the art, to arrest the stop ratchet at the proper time and thus prevent undue continuation of the movement imparted to the shaft 3. The shaft 3 is commonly extended, as shown in Figure 1, to the end or side of the carriage for the operation of the master wheel 13 of what is generally termed a crossfooting register 14. The master wheel 13 is what is known as a secondary master wheel or actuator and is operated from the shaft 3 by means of variable gearing 15 which is automatically controlled, to secure an adding or subtracting operation of the crossfooter register 14 as desired, by a control lever 16 coacting with control stops 17 mounted on a stationary control bar 18. The specific character of this variable gearing 15 forms no part of my present invention but it will be readily understood by reference to Figs. 14 to 17 of the drawings in which a comparatively large gear wheel $a$ is mounted at one end of the primary actuator shaft 3, and $b$ is a somewhat smaller gear on the secondary actuator shaft 13$a$.

Intermediate of the gears $a$ and $b$ is a laterly shiftable gear $c$ which in one position constitutes a single intermediate gear between the gears $a$ and $b$ and serves to transmit rotary motion to the gear $b$ from the gear $a$. As will be noted from Figs. 15 and 17, the gear $c$ is comparatively narrow and the gears $a$ and $b$ comparatively wide and so disposed relatively that the gear $c$ may be shifted into and out of mesh with the gear $b$ while remaining constantly in engagement with the gear $a$. This results in the constant driving of the gear $c$ from the gear $a$, notwithstanding the fact that the gear $c$ may be shifted into or out of engagement with the gear $b$. When the gear $c$ is shifted out of engagement with the gear $b$ it moves into gear with one side of a twin gear $d$, the other side of which is in constant mesh with the gear $b$ on the secondary shaft. It will therefore appear that in one position of the gear $c$ it constitutes a single intermediate gear between the gears $a$ and $b$, and in the other position is driven from the gear $a$ and drives the twin gear $d$ which in turn drives the gear $b$. The introduction of the twin gear $d$ in the line of connection between the gears $a$ and $b$ serves to reverse the direction of rotation of the gear $b$ so that it will rotate in the opposite direction to the gear $a$. In other words, in one position of the shiftable gear $c$ the train of effective gearing consists of $a$, $b$ and $c$, $a$ and $b$ rotating in the same direction, while in the other position of the gear $c$ the effective train of gearing is $a$, $c$, $d$ and $b$, $a$ and $b$ rotating in opposite directions.

The manner in which the control lever 16 is connected to the gear $c$ to shift the same is not material, but as shown in Figs. 2, 3 and 14 the upper end of the lever 16 may engage a pin 16$a$ projecting from a slide 16$b$ suitably mounted and yoked to the shifting gear $c$. As the control stops 17 are mounted on a relatively stationary control bar 18 as heretofore stated, it will be evident that at a predetermined point in the advance of the carriage the lever 16 will come into cooperative relation with the control stop and will be swung to shift the gear $c$ for the purpose of reversing the motion transmitted to the gear $b$ and thus to the secondary master wheel 13. The master wheel 13 of the crossfooter is stepped across a series of number wheels 19 by the master wheel advancing lever 20 coacting with stops 21 when the carriage reaches a field or column of the work sheet concerned in a given computing operation.

Attention is directed to the fact that the register 14 is movable with the carriage and is operable either for addition or subtraction when the machine is disposed to print at any point on the work sheet, represented by the aforesaid control stops 17 and 21. That is to say, if we assume that the machine is arranged to print successively in a series of columns, the register 14 may be caused to either add or subtract as the numbers are printed in any column position by the proper selection and location of the stops which determine whether the register shall add or subtract and which serve to advance the master wheel 13 across the number wheels of the register. The primary master wheel 22 extends rearwardly from the carriage at about its middle but, in accordance with my present invention, is not mounted on the shaft 3 as is customary, but is secured by a short shaft 23 mounted in bearing brackets 24 and 25. Between the primary master wheel 22 and the primary actuator shaft 3 I locate variable gearing controlled by a subtraction key 26 by means of which the gearing normally arranged to drive the wheel 22 in the adding direction, may be reorganized to reverse the direction of rotation of the primary master wheel for subtraction. The gearing referred to includes a gear wheel 27 fixed to the inner or left-hand end of the main actuator shaft 3 and geared through a twin gear 28, 28A to a gear 29 on the short shaft 23 of the primary master wheel. The twin gear 28, 28A is laterally shiftable on a stub shaft 30 extended from a bracket 31 which also affords a bearing for the shaft 3. This shifting movement serves to move the section 28A of the twin gear into and out of mesh with the gear 29, but does not serve to disturb the connection between the section 28 of this gear and the gear 27 with which it is in constant mesh. When the section 28A of the shifting twin gear moves out of mesh with the wheel 29 it moves into mesh with one section 32 of another twin gear 32, 32A, the other section 32A of which is in constant mesh with the gear 29. Thus, it will be seen that the main actuator shaft 3 drives the primary master wheel 22 through the gears 27, 28, 28A and 29 for addition.

It will also be seen that by shifting the gear 28, 28A out of mesh with the gear 29 and into mesh with the other twin gear 32, 32A an additional gear will be imposed in the line of motion which will be from the shaft 3 through the gears 27, 28, 28A, 32, 32A and 29 to drive the master wheel in the opposite or subtracting direction. The shifting of the twin gear 28, 28A to control the direction of movement of the primary master wheel is effected by a gear shifter 33 mounted to slide through the bracket 24 and pivotally connected to a double bell crank lever 34 to one end of which is connected a retracting spring 35 and to the other end of which is pivotally connected a stem 36 of the subtracting key 26. It will now be seen that the common actuator shaft 3 is arranged to drive a plurality of master wheels 22 and 13 simultaneously, but that by reason of the interposition of variable gearing between the primary shaft and each of the two master wheels or actuators, the latter may be operated both in the adding direction, both in the subtracting direction, or either one in the adding direction and the other in the subtracting direction. Assuming, therefore, that the registers or computing devices operated by these master wheels respond in the character of their operation to the direction of rotation of the respective master wheels, a wide range of operative possibility is secured and a maximum flexibility attained. In Figure 1 I have indicated a plurality of column registers 37, 38, 39 and 40, though obviously any number of such registers may be employed and positioned in any desired laterally spaced positions to correspond with the locations on the work sheet, of the zones or columns to which these registers are appropriated. I have shown four merely for the purpose of more clearly indicating the flexibility of the machine as a whole. For instance, when the master wheel 22 is opposite the register 37 the registers 37 and 14 may be caused to add simultaneously by the rotation of both master wheels in the adding direction. When the register 38 is in use, the registers 38 and 14 may both be caused to subtract by the simultaneous operation of both master wheels in the subtracting direction. When the register 39 is in use, the depression of the subtracting key 26 may cause the register 39 to subtract while the register 14 is adding, and when the register 40 is being operated to add by the primary master wheel, the register 14 may be operated for subtraction. Of course these permutations are not fixed, but may be selectively determined at any operating zone or column regardless of the location and number of the latter. As shown in Figures 8 to 13, each of the column registers includes a base 41 detachably and adjustably secured to a register supporting bar 42 by a securing device 43. Within the casing are mounted a series of number wheels 44 occupying progressive denominational positions and disposed to be engaged and operated one after another by the primary master wheel 22. Also meshing with the wheels 44 are a series of registering wheels 45 bearing peripheral digits exhibited before a sight opening to register the accumulated value in a manner well understood in the art.

In its progress across the register, the master wheel is guided and guarded by a comb plate 46 with which the register is equipped and the number wheels 44 are accurately located by detent rollers 47 carried by spring urged detent arms 48. Associated with the number wheels 44 are carrying trips 49 normally centered by springs 50 which permit the trips to be swung by the wheels 44 in the operation of carrying, whether the wheels are rotated in one direction for addition, or in the opposite direction for subtraction. Each of the trips 49 projects between a pair of wheels 44 to be engaged by a widened carrying tooth with which each wheel is provided, as said wheel moves from nine to nought. When thus operated by a number wheel, the trip is swung to release a carrying dog 51 normally held in its retracted position by a bar 52. The carrying dogs are arranged in a series as each number wheel must be carried by a dog when the next lower number wheel makes a complete rotation. A similar set of carrying dogs 51A located at the other side of the series of trips 49, are held retracted by a bar 52A. The sets of carrying dogs are pivotally mounted at their rear ends upon angular levers 53 and 53A, fulcrumed upon fixed shafts 54. These levers constitute dog carriers. Each carrying dog 51, 51A is urged toward its engaging position by a spring 55 or 55A connected at one end to the tail piece of the dog and at its opposite end to the rearwardly extended arm of the dog carrier. The dog carriers 53 and 53A are urged toward the carrying position by motor springs 56, each of which is common to a pair of carriers and urges either of said carriers in a direction to urge its dog to carry from one wheel to the next when the dog is released from its bar by the tilting of the trip as a number wheel, moved in one direction or the other for addition or subtraction, completes a cycle of movement. This operation or carrying movement of the dog causes it to engage a tooth of a wheel 44 of next higher order or denominational value to the one which operated the trip to rotate the wheel engaged one additional step. This carrying movement of the dog is limited by one of a pair of stop bars 57 or 57A which engages a shoulder 58 of the dog. Obviously, any carrying device or carrying devices which have operated during the traverse of the register by the master wheel must be restored to normal position before the register is again traversed and operated. This restoring operation is effected upon retraction of the carriage by a restoring cam 59 mounted on the carriage and caused by the retraction of the latter to operate a restoring slide 60, a fixed guard 61 extended from the base 41 serving to guide and guard the cam through this operative movement. The restoring slide 60 is preferably in the form of a light but rigid frame, the side members 60A and 60B of which are connected by a plate 62 extended to form stops 63 which engage fixed stop blocks 64 to arrest the restoring slide in its normal position. The restoring slide 60 is designed to operate a pair of restoring frames 65 and 66 mounted to swing from their rear ends and having their front ends disposed to engage the rear ends of two series of dog carriers 53 and 53A. These frames 65 and 66 normally occupy the positions shown in Figure 8 and afford no obstruction to the proper movement of the dog carriers incidental to the carrying operation. To urge the restoring frames 65 and 66 apart for the purpose of restoring any carrier from the carried position indicated in dotted lines in Figure 8 to the normal position illustrated in said figure in full lines, a spreading mechanism operated by the slide is provided. This spreading mechanism includes a toggle arrangement comprising a pivoted spreader 67 having its opposite ends connected to the respective restoring frames 65 and 66 by links 68 and arranged to be rocked or swung by a bell crank lever 69 fulcrumed at 70 on a bracket 71 connected to the spreader 67 by a link 72. Any suitable connection, as for instance, a slot and pin connection 73 may be effected between the bell crank lever 69 and the restoring slide 60. A spring 74 connected to a fixed part of the register casing and to the lever 69, retains the slide 60 and the various other elements of the restoring mechanism in normal position and returns these parts to such position after yielding to permit the restoring operation as the cam 59 passes back across the register and retracts the restoring slide. It will be noted that the various described members of the restoring mechanism are duplicated as shown in Figures 9 to 12 more particularly, for the reason that the dog carriers to be operated extend practically the entire width of the register and the various elements are therefore arranged in the form of frames including side members and cross members which practically occupy the width of the casing.

It will now be observed that since both the column registers and the additional register or crossfooter are all capable of operation in either direction to add or substract, and since each master wheel may be operated to either add or subtract, the several recited objects of the invention are readily attained.

It is thought that from the foregoing the illustrated embodiment of my invention will be clearly understood, but I wish to reserve the right to effect such modifications and variations of the illustrated structure as may come fairly within the scope of the protection prayed.

What I claim is:

1. In a computing device, the combination with a series of denominational members and carrying mechanism therefor including two sets of carrying devices, said sets having relative separative movement to restore them to normal position, of restoring frames, one of which is associated with each set of carrying devices to restore the same to normal position, a rotative spreader intermediate the restoring frames, and a slide operatively connected to the spreader and extended outside the computing device for actuation.

2. In a computing device, the combination with a series of denominational members and carrying mechanism therefor including two sets of carrying devices, said sets having relative separative movement to restore them to normal position, of restoring frames for the carrying devices, a spreader pivoted between the restoring frames, links connecting the spreader at opposite sides of its axis with the respective restoring frames, a restoring slide, and a connection between the restoring slide and the spreader.

3. In a computing device, the combination with a series of denominational members and carrying mechanism therefor including two sets of carrying devices, said sets having relative separative movement to restore them to normal position, of restoring frames for the carrying devices, a spreader pivoted between the restoring frames, links connecting the spreader at opposite sides of its axis with the respective restoring frames, a restoring slide, a bell crank lever operated by the slide, and a link connection between the bell crank lever and the spreader.

4. In a computing device the combination, with a series of denominational members, and carrying mechanism including levers arranged in superposed sets and movable to restore said mechanism, of restoring mechanism including a spreader pivoted intermediate said sets of levers, and means for operating the spreader.

5. In a computing device the combination, with a series of denominational members, and carrying mechanism including levers arranged in superposed sets and movable to restore said mechanism, of restoring mechanism including a spreader pivoted intermediate the sets of levers, and a horizontally movable restoring slide located below said levers and operatively connected to the spreader.

6. In a computing device, the combination with a series of denominational members and carrying mechanism including levers having relative separative movement to restore said carrying mechanism, of a pivoted spreader intermediate said levers for effecting separative movement thereof, and means for operating the spreader.

7. In a computing device, the combination with a series of denominational members, and carrying mechanism including levers arranged in superposed sets and movable to restore said mechanism, of restoring mechanism including a spreader pivoted intermediate said sets of levers, and carriage operated means for operating said spreader.

In testimony whereof I hereunto affix my signature.

HARRY ARTHUR FOOTHORAP.